United States Patent Office 3,538,526
Patented Nov. 10, 1970

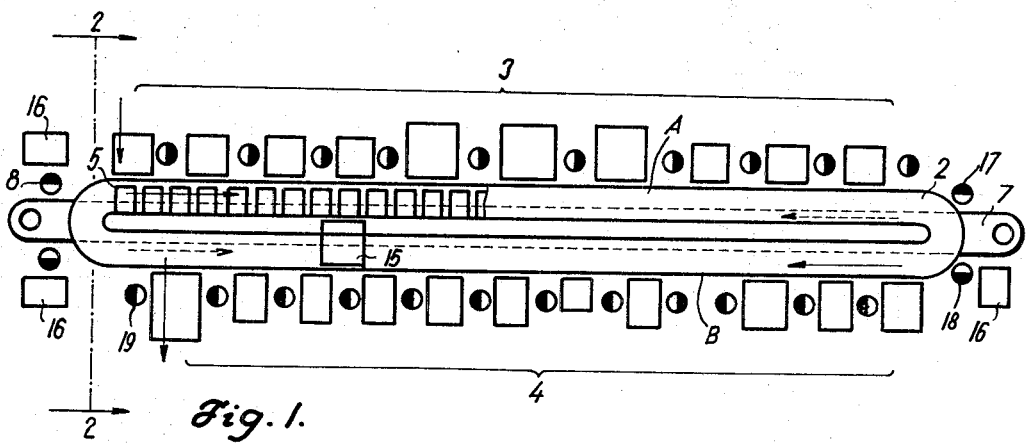
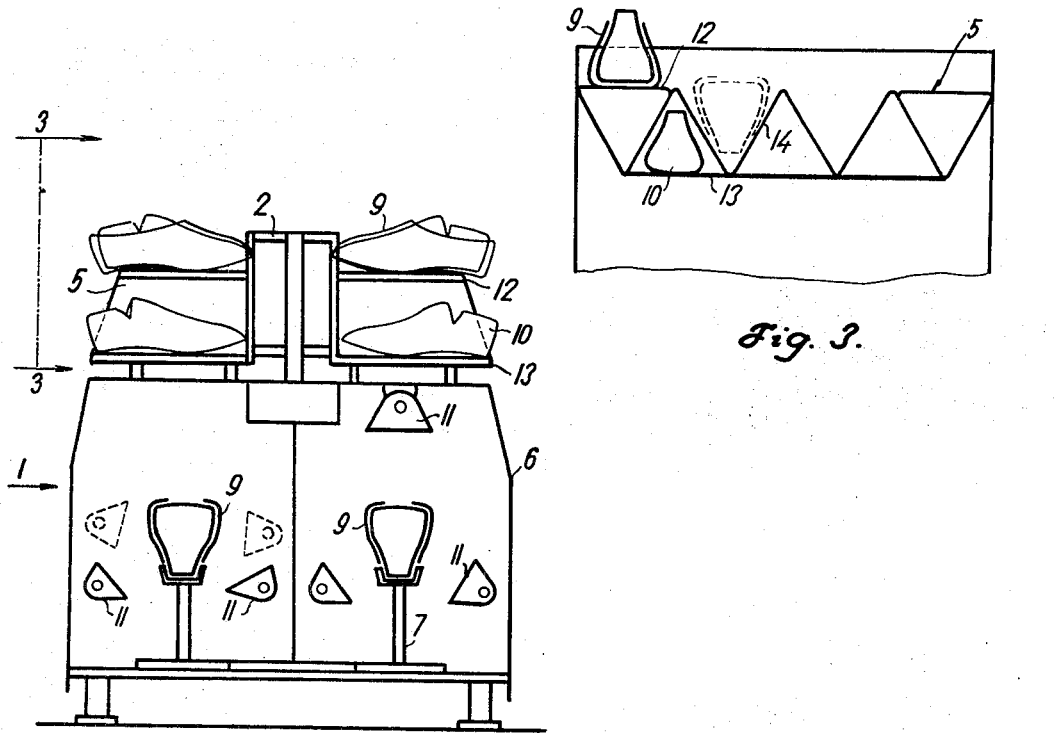

3,538,526
FLOW LINE FOR THE PRODUCTION OF CEMENTED FOOTWEAR
Josef Horak, Gottwaldov, Jiri Paulus, Vizovich, and Frantisek Volek, Zdenek Figalla, Josef Hanko, Oldrich Hadac, and Alois Opravil, Gottwaldov, Czechoslovakia, assignors to Statni vyzkumny ustav kozedelny, Gottwaldov, Czechoslovakia
Filed July 28, 1969, Ser. No. 845,480
Claims priority, application Czechoslovakia,
Aug. 2, 1968, 5,622/68
Int. Cl. A43d
U.S. Cl. 12—1   7 Claims

ABSTRACT OF THE DISCLOSURE

Between a row of machines in a lasting section and a parallel row of machines in a finishing section there is disposed a first, upper conveyor with a system of racks for carrying lasts, shoe uppers, and shoes. Beneath the first conveyor there is a heated covered tunnel through which runs a second, lower conveyor driven in a direction opposite the first conveyor. During the travel of the second conveyor through the first side portion of the heating tunnel, the shoe upper is set upon the last. Adhesive is applied to the shoe upper margin folded over the featherline of the last onto the insole at a station on the second conveyor beyond the end of its first side portion of the second conveyor, the solvents of the adhesive evaporated by moving the shoe upper and last through the second side portion of the second conveyor.

---

This invention relates to an apparatus for making cemented shoes. The invention relates particularly to the making of shoes with preformed soles, the apparatus including lasting machines and machines for stitching soles.

Prior apparatus for making shoes have combined conveyors with stock holders. Shoes were mounted in five-pair racks rotatably mounted on vertical axes upon and above an endless conveyor having two elongated runs disposed in the same horizontal plane and moving in opposite direction. After having finished a certain operation, the worker turned the full five-pair rack about its vertical axis, so that the shoes which had been operated upon were then positioned in a heating tunnel which overlay the space between the runs of the conveyor. This construction was disadvantageous because of the undue height of the racks; and working conditions were unsatisfactory because it was impossible to secure an adequate sealing of the heating tunnel, and much heat escaped into the workers' area through the racks.

In other prior systems the drying unit was located above the conveyor, or the drying unit was located near the main endless conveyor, either parallel or normal to it. Both such arrangements required an unduly large amount of space. In yet another prior system, an endless conveyor track moving in a vertical plane was employed, such conveyor having an independent drier arranged at one end thereof. Such last system displayed advantages in certain shoe-making processes.

The above-outlined disadvantages of prior art systems are eliminated by the apparatus of the present invention. In such apparatus, the machines in the lasting section are arranged in a first row, the machines in the finishing section are arranged in a second row spaced from and preferably parallel to the first row, the machines in the respective rows being spaced from each other to provide adequate working space therebetween. A first conveyor having two elongated parallel runs both disposed in a common horizontal plane is located between the first and second rows of machines with the runs of the conveyor cooperating with the respective rows of machines. The first conveyor is provided with racks for carrying shoe parts from one machine to the next.

Beneath the first conveyor there is disposed a second conveyor having two elongated parallel runs both disposed in a common horizontal plane. The second conveyor is longer than the first conveyor, the turntables are large horizontal sprockets about which the opposite ends of the opposed runs of the second conveyor travel being located markedly beyond the opposite ends of the first conveyor. The main, intermediate portion of the second conveyor, generally below the first conveyor, travels through an elongated covered heating tunnel. The first and second conveyors are driven so that the runs of each which face the lasting machines travel in opposite directions; the same is true of the runs which face the finishing mechines.

At one of the ends of the second conyevor, outwardly of the heating tunnel, there is provided a machine for applying adhesive to the margin of the shoe upper which is folded over the featherline of the last and onto the insole. At the other end of the heating tunnel, that is, the end at the end of the lasting section, a first side portion of the tunnel is provided with a unit for setting the shoe upper on a last; the first and the other second side portion of the tunnel are provided with means for evaporating the volatile ingredients of the solvents from the adhesive layer.

In the drawings, which show a non-limiting embodiment of apparatus in accordance with the invention:

FIG. 1 is a diagrammatic lay-out in plan of a preferred embodiment of apparatus in accordance with the invention;

FIG. 2 is a view in vertical transverse section through the apparatus, the section being taken along the line 2—2 of FIG. 1; and FIG. 3 is a view in side elevation of the rack employed on the first, upper conveyor, the view being taken from line 3—3 of FIG. 1.

Turning now to the drawings, in FIGS. 1 and 2 there is shown an elongated housing 1 having a first upper endless conveyor with a driven chain 2, such conveyor having opposed elongated horizontal runs A and B disposed in the same horizontal plane. Run A confronts and is parallel to a row of machines in the lasting section 3 of the apparatus, whereas run B confronts and is parallel to a row of machines in the finishing section 4 on the other side of the apparatus. The length of runs A and B of the conveyor chain 2 is such that adequate working space is provided between successive machines in the sections 3 and 4.

Affixed to the chain 2 of the first conveyor, at the height of the operator's hands, are a succession of one-pair racks 5, the construction of which is more clearly shown in FIG. 3. Racks 5 are of the double-tier type, the upper platform 12 being designed for one pair of shoes on lasts 10, whereas the lower platform 13 is designated for lasts 10 after slipping off the shoes. The upper platform 12, besides having two spaced horizontal surfaces for receiving shoes on lasts, also has two V-shaped hollows for positioning the lasts 10 with their insoles up.

The upper conveyor is designed in such a way that at any point it is possible to locate setting and drying units on it; one such unit is shown at 15 in FIG. 1.

In the lower part of the elongated horizontal housing 1 there is a heated covered tunnel 6 through which a second, lower chain conveyor 7 travels. The opposite ends of conveyor 7 extend markedly outwardly beyond the ends of tunnel 6 and the first, upper conveyor, the opposed runs of chain 7 being disposed in a horizontal plane. The chain conveyor 7 is provided with pins, preferably in the vertical position as shown, which fit within the thimble of the lasts 10 and lock the lasts against turning. Chain 7 of the second conveyor is driven in a direction opposite that of chain 2 of the first conveyor as shown by the arrow in FIG. 1. Chains 2 and 7 are driven by an electric motor by way of gear boxes (neither the motor nor the gear boxes being shown) the speed of driving being determined by the length of the conveyors and the capabilities of the workers. The opposite ends of the opposed runs of chain 7 travel around turntables or sprockets, as shown, there being put-aside platforms 16 for the temporary storing of the shoe uppers and lasts at the end of working shifts. At the end of the second, lower conveyor immediately in advance of the finishing section 4 there is provided a machine 8 which applies adhesive to the shoe upper lasting margin which is folded over the featherline of the last on the insole.

The portion of the tunnel 6 in which the conveyor chain 7 travels from the lasting section 3 is designed for setting the shoe upper 9 on the last 10; such portion of the tunnel is provided with infra-red heaters 11 of the tubular type. The portion of the tunnel 6 in which the chain 7 travels toward the beginning of the finishing section 4 is also designed for the evaporation of volatile ingredients of solvents from the adhesive layer, and is similarly provided with infra-red heaters 11.

The operations on the apparatus according to the invention begins with attaching insoles to the last and applying the shoe upper. The preparation of the shoe upper for lasting is usually carried out separately in advance, and only with lower outputs can it be included in the flow line. The shoe being processed, enters the lasting section 3 at the left hand end thereof as shown by the vertical arrow, advances through section 3 from one operation to another using the upper conveyor chain 2. After the final operation in the row of machines in the lasting section 3, the last with the shoe upper is put on the right hand extended portion of the lower chain conveyor 7. The shoe upper 9, the margin of which was folded over the featherline of the last and attached to the insole, is carried to the left together with the last positioned on the pin of the chain conveyor 7 through the setting unit of the tunnel 6. Having run out of one side portion (upper as shown) of the tunnel 6 onto the left hand turntable portion of the chain conveyor, the shoe upper margin folded over the featherline of the last is provided with an adhesive layer by the machine 8. Then, the last with the shoe upper is carried to the right by the chain conveyor 7 through the other portion of the tunnel 6 where the evaporation of volatile ingredients of solvents in the adhesive layer occurs together with further setting the shoe upper. After the last with the shoe upper has run out of the right hand end of the tunnel 6, the operator at 18 grips it, performs the first operation in the finishing section 4, and sends it to the left on the upper conveyor chain 2 to the next operation in finishing section 4.

After having slipped the shoe off the last, the operator puts the last on the lower platform 13 of the rack 15, whereas the shoe is carried to the next operation on the upper platform 12. At the left hand lower end of the conveyor chain 2 the finished shoe is removed from the production line, by the operator at 19, as shown by the lower vertical arrow, boxed, and prepared to be delivered, whereas the lasts on the conveyor chain 2 are transported to the first operation at the left hand end of section 3 where they enter the production cycle again. The lasts have a closed circulation, the apparatus shown requiring 100 active pairs of lasts.

This enables the manufacturer to link the apparatus of the invention up to the present hundred-pair system of the daily plan detailing of a shoe factory. When higher output of the line is demanded, it is possible to supplement the basic conveyor with an auxiliary band conveyor at which the finishing operations are performed without lasts.

In an apparatus in accordance with the invention the need of lasts is reduced to 150 pairs including 50 pairs of reserve with the daily output up to 1,500 pairs of shoes in one shift. The proper conveyor includes 100 pairs of lasts, which corresponds to the present conventional hundred-pair system. In keeping the same assortment, the lasts need not be transported or dislocated in hundred-pair lots. The organization system of the plan detailing, the design of the proper conveyor, as well as the lay-out of individual technological operations, guarantee the automatic transportation of lasts from the operation of slipping off shoes directly to the first operation of insole attaching. The location of lasts on the conveyor system is solved in such a manner that the possibility of through-feed drying of shoes after dressing, after finishing the sole bottoms, etc., is not interfered with. These drying units can be operationally located wherever above the conveyor after performing the appropriate operations in places where it is necessary. The conveyor combines the proper transporting means for the transportation of lasts with the shoe upper from one operation of the other, a through-feed shoe setting unit and a through-feed shoe drying unit for the evaporation of volatile ingredients from adhesives, dyes, dressings, etc. Up to the present, the units for these purposes have been located out of the conveyor system. With the method according to the invention, the space of the conveyor is fully utilized both horizontally and vertically, and the length of the whole flow line is shortened by about one third.

The designing conception according to the invention simplifies also the production of said units because the systems of electro-installation and air engineering are concentrated to one unit and the whole system can be controlled from one point. This design considerably reduces the production costs. Moreover, the equipment according to the invention improves the appearance of the whole working place and reduces the lay-out of the workshop, because the whole area around the conveyor is utilized by the production machines, whereas for the setting and drying of shoes a sufficient space has been created for perfect carrying out the chemical and technological operations in the given period.

What is claimed is:

1. Apparatus for the production of cemented shoes, comprising a first row of spaced machines forming a lasting section, a second row of spaced machines forming a finishing section, the two rows being disposed in spaced relationship confronting each other, a first endless conveyor having first and second elongated parallel runs located between the respective rows of machines in position to cooperate therewith, the first conveyor being driven in such direction that its first run travels from the entering to the delivery end of the lasting section and its second run travels from the entering end of the finished section, adjacent the delivery end of the lasting section, to the delivery end of the finishing section, the first conveyor being provided with racks for carrying shoe uppers and lasts, an elongated heating tunnel disposed beneath the first and second runs of the first conveyor, and a second, lower driven endless conveyor disposed generally beneath the first conveyor, the second conveyor having spaced first and second elongated runs which extend through the heating tunnel along the length thereof, the ends of the second conveyor extending outwardly beyond the respective ends of the heating section, the second conveyor being driven in the opposite direction from the first conveyor, whereby shoe uppers delivery from the lasting section may be transferred to the second conveyor to be carried through the heating tunel to set the uppers on the lasts, following which the shoe uppers and lasts may be transferred to the entering end of the finishing section.

2. Apparatus according to claim 1, wherein the rows of machines forming the lasting and finishing sections are parallel to each other, and the opposed runs of the upper and lower conveyors are parallel to each other and to the rows of machines, 3. Apparatus according to claim 1 for the production of shoes with prefinished soles, comprising a machine disposed at the junction of the delivery end of the first run of the second conveyor and the entrance end of the second run of such conveyor for applying adhesive on the shoe upper margin folded over the featherline of the last onto the insole, the second conveyor carrying lasts with insoles and uppers applied thereto through the second portion of the heating tunnel.

4. Apparatus according to claim 3, comprising means within the first side portion of the heating tunnel through which the first run of the second conveyor extends for heating the uppers and setting them on the last, and means within the second side portion through which the second run of the second conveyor extends for heating the uppers and insoles to evaporate the solvent of the adhesive therebetween.

5. Apparatus according to claim 1, wherein the means for heating the tunnel are infra-red heating means.

6. Apparatus according to claim 1, wherein the racks on the first conveyor are one-pair racks, one portion of each rack being adapted to support a pair of shoes, and the other portion being adapted to support lasts after they have been removed from the shoes.

7. Apparatus according to claim 1, wherein the racks on the first conveyor are one-pair racks having two tiers, the upper platform of the racks being adapted to support a pair of shoes, and the lower platform of the racks being adapted to support lasts after they have been removed from the shoes.

References Cited
UNITED STATES PATENTS

| | | |
|---|---|---|
| 2,940,094 | 6/1960 | Bromfield. |
| 3,120,666 | 2/1964 | Murphy. |
| 3,220,033 | 11/1965 | Bromfield et al. |

PATRICK D. LAWSON, Primary Examiner